United States Patent
Allmendinger et al.

(10) Patent No.: US 11,839,985 B2
(45) Date of Patent: Dec. 12, 2023

(54) CONTROL OF A ROBOT ASSEMBLY

(71) Applicant: KUKA Deutschland GmbH, Augsburg (DE)

(72) Inventors: Felix Allmendinger, Augsburg (DE); Jan Bandouch, Munich (DE); Günter Schreiber, Friedberg (DE)

(73) Assignee: KUKA Deutschland GmbH, Augsburg (DE)

( * ) Notice: Subject to any disclaimer, the term of this patent is extended or adjusted under 35 U.S.C. 154(b) by 600 days.

(21) Appl. No.: 16/617,790

(22) PCT Filed: May 17, 2018

(86) PCT No.: PCT/EP2018/062937
§ 371 (c)(1),
(2) Date: Nov. 27, 2019

(87) PCT Pub. No.: WO2018/219673
PCT Pub. Date: Dec. 6, 2018

(65) Prior Publication Data
US 2020/0114518 A1    Apr. 16, 2020

(30) Foreign Application Priority Data
May 31, 2017    (DE) .................... 10 2017 005 194.1

(51) Int. Cl.
*B25J 9/16*       (2006.01)
*G05B 19/4103*    (2006.01)

(52) U.S. Cl.
CPC .......... *B25J 9/1697* (2013.01); *B25J 9/1664* (2013.01); *G05B 19/4103* (2013.01); *G05B 2219/37017* (2013.01); *G05B 2219/39391* (2013.01)

(58) Field of Classification Search
CPC ...... B25J 9/1697; B25J 9/1664; B25J 9/1653; G05B 19/4103; G05B 2219/37017; G05B 2219/39391; G05B 21/00
See application file for complete search history.

(56) References Cited

U.S. PATENT DOCUMENTS

2003/0144765 A1    7/2003   Habibi et al.
2004/0133309 A1    7/2004   Huttenhofer et al.
(Continued)

FOREIGN PATENT DOCUMENTS

DE    4021330 A1    1/1992
DE    4238938 C2    10/2003
(Continued)

OTHER PUBLICATIONS

Object Definition & Meaning _ Dictionary.com.pdf (Object Definition & Meaning | Dictionary.com, Dec. 21, 2022, https://www.dictionary.com/browse/object, pp. 1-6) (Year: 2022).*
(Continued)

*Primary Examiner* — Bao Long T Nguyen
(74) *Attorney, Agent, or Firm* — Dorton & Willis, LLP (57) ABSTRACT

A method for the control of a robot assembly having at least one robot. The method includes acquiring pose data from an object arrangement having at least one object, which data has a first time interval; determining modified pose data from the object arrangement, which data has a second time interval that is larger or smaller than the first time interval, or is equal to the first time interval, on the basis of the acquired pose data; and controlling the robot assembly on the basis of said modified pose data.

16 Claims, 2 Drawing Sheets

(56) References Cited

U.S. PATENT DOCUMENTS

| | | | | |
|---|---|---|---|---|
| 2014/0067317 | A1* | 3/2014 | Kobayashi | B25J 9/1697 |
| | | | | 702/153 |
| 2016/0232654 | A1* | 8/2016 | Suzuki | B25J 9/1697 |
| 2016/0318187 | A1* | 11/2016 | Tan | B25J 9/1697 |

FOREIGN PATENT DOCUMENTS

| | | |
|---|---|---|
| DE | 10251600 A1 | 5/2004 |
| DE | 102005060967 B4 | 10/2007 |
| DE | 102010017857 A1 | 10/2011 |
| DE | 202013104860 U1 | 2/2015 |
| GB | 2246216 A | 1/1992 |

OTHER PUBLICATIONS

Hashimoto K et al, "Manipulator control with image-based visual servo", Proceedings of the International Conference On Robotics and Automation Sacramento, Apr. 9-11, 2019; [Proceedings of the International Conference On Robotics and Automation], Los Alamitos, IEEE Comp. Soc. Press, US, (Apr. 9, 1991), vol. CONF. 7, doi:10.1109/ROBOT.1991.131968, ISBN 978-0-8186-2163-5, pp. 2267-2271.

Adam Coates, Andrew Y. Ng. Multi-Camera Object Detection for Robotics. IEEE International Conference on Robotics and Automation, Jun. 2010; 12 pages.

Wikipedia: Sample-rate conversion. Version from Feb. 20, 2017; 4 pages.

Wikipedia: Upsampling. Version from May 10, 2017; 3 pages.

Wikipedia: Downsampling (signal processing). Version from May 9, 2017; 3 pages.

Wikipedia: Low-pass filter. Version from May 23, 2017; 7 pages.

Matthias Faessler, Elias Mueggler, Karl Schwabe and Davide Scaramuzza. A Monocular Pose Estimation System based on Infrared LEDs. 2014 IEEE International Conference on Robotics and Automation (ICRA); 10 pages.

Vicon Nexus Product Guide. 2015, Vicon Motion Systems Limited; 362 pages.

Best practices for sensor networks and sensor data management. 2014. http://wiki.esipfed.org/images/a/ad/Sensor_best_practices_1Dec2014.pdf; 59 pages.

https://reference.wolfram.com/applications/eda/SmoothingDataFillingMissingDataAndNonparametricFitting.html in Internet Wayback Machine for Apr. 21, 2017: https://web.archive.org/web/20170421065227/https://reference.wolfram.com/applications/eda/SmoothingDataFillingMissingDataAndNonparametricFitting.html; 27 pages.

ResearchGate: "How do I fill gap in time series data?", 2015 https://www.researchgate.net/post/How_do_I_fill_gap_in_time_series_data; 7 pages.

Norm: IEC 60204-1, Fourth edition Oct. 1997. "Safety of machinery—electrical equipment of machines"; 96 pages.

A tutorial on visual servo control; S. Hutchinson; G.D. Hager; P.I. Corke; IEEE Transactions on Robotics and Automation (vol. 12, Issue: 5, Oct. 1996); DOI: 10.1109/70.538972; 20 pages.

European Patent Office; Search Report in related International Patent Application No. PCT/EP2018/062937 dated Oct. 5, 2018; 3 pages.

European Patent Office; Written Opinion in related International Patent Application No. PCT/EP2018/062937 dated Oct. 5, 2018; 15 pages.

German Patent Office; Examination Report in related German Patent Application No. 10 2017 005 194.1 dated Mar. 2, 2018; 5 pages.

German Patent Office; Opposition in related German Patent Application No. 10 2017 005 194.1 dated Jun. 11, 2019; 19 pages.

Chinese Patent Office; Office Action in related Chinese Patent Application No. 2018800355024 dated Jun. 28, 2022; 11 pages.

Chinese Patent Office; Office Action in related Chinese Patent Application No. 2018800355024 dated Dec. 7, 2022; 12 pages.

* cited by examiner

CONTROL OF A ROBOT ASSEMBLY

CROSS-REFERENCE TO RELATED APPLICATIONS

This application is a national phase application under 35 U.S.C. § 371 of International Patent Application No. PCT/EP2018/062937, filed May 17, 2018 (pending), which claims the benefit of priority to German Patent Application No. DE 10 2017 005 194.1, filed May 31, 2017, the disclosures of which are incorporated by reference herein in their entirety.

TECHNICAL FIELD

The present invention relates to a method and a system for the control of a robot assembly having at least one robot, and to an assembly having the system and a computer program product for carrying out the method.

BACKGROUND

A known in-house practice is to detect positions of objects, for example by means of cameras, and to control robots according to these detected positions—for example, to follow the objects, to avoid them, pick them up, or the like.

In this case, the time intervals in which the positions are detected are often greater than a control cycle used in controlling the robots.

Accordingly, according to in-house practice for the control of the robots on the basis of the detected positions of the objects, are first determined on the basis of these robot target positions (for example, by corresponding inverse kinematics or the like) and then (finely) interpolated onto the control cycle of the robot controller between these robot target positions.

SUMMARY

The object of the present invention is to improve a control of a robot arrangement having at least one robot.

This object is achieved by a method, a system and/or computer program product for carrying out the method, and/or an assembly having a robot arrangement and a system as described herein for controlling the robot arrangement according to the method, as described herein.

According to an embodiment of the present invention, a robot arrangement in one implementation comprises one or more robots which—and/or one or more of which—(each) has/have at least three, particularly at least six, and particularly at least seven, particularly motor-actuated, axes and/or joints, particularly rotary axes and/or joints.

According to an embodiment of the present invention, a method for the control of the robot arrangement comprises the steps—which are particularly cyclically repeated and/or sequential and/or consecutive—of:

- detecting, particularly by means of at least one (first) sensor, (first) pose data of an object arrangement having one or more objects, wherein the detected pose data comprise a first time interval which is particularly a minimum, maximum, and/or average and/or averaged time interval;
- determining, on the basis of and/or according to the detected (first) pose data, and particularly from the same, modified (first) pose data of the object arrangement which comprise a second, particularly minimum, maximum and/or average or averaged time interval which is less than or greater than—in one embodiment, greater by a factor of at most 20, particularly by a factor of at most 2, and in one embodiment less by at least a factor of 2, particularly by at least a factor of 10, and/or by at most a factor of 200, particularly less by at most a factor of 120—than the first time interval, or is equal to the first time interval; and
- controlling the robot arrangement, particularly determining, commanding and/or moving toward target positions of the robot arrangement, particularly of its robot and/or of one or more of its robots, on the basis of the modified (first) pose data, particularly for the robot arrangement to follow, grasp, and/or avoid the object or one or more object(s), wherein, for reasons of simplifying this description, regulating the robot or one or more robots of the robot arrangement is referred to as controlling. In one further embodiment, the control of the robot arrangement on the basis of modified pose data comprises a superposition of modified pose data with manipulation instructions, particularly paths or the like, which are prespecified, and particularly defined, relative to the object arrangement—particularly traversing paths toward and/or relative to objects whose poses are and/or will be determined by the modified pose data.

In one embodiment, therefore, no longer are robot target positions first determined on the basis of detected pose data, with a (fine) interpolation being performed only then and/or between these data and/or in the axis spaces and/or joint spaces of the robot arrangement; rather, already-modified pose data with a higher (sample) rate are provided and/or used for the control.

In this way, in one embodiment, one or more disadvantages that eventually and/or only arise in the axis space of the robot as a result of such a late and/or delayed fine interpolation—such as noises, unsteadiness, axis hum, jitters, latency or the like—are reduced, and preferably prevented.

A second time interval which is less than the first time interval corresponds to a fine interpolation and/or extrapolation in the narrower sense. In this way, particularly a slower sampling rate of the (detection of the, and/or of the detected) pose data can advantageously be combined with a shorter control and/or regulation cycle. As such, for example, a first time interval of approx. 20 ms of a 50 Hz camera with interlacing function can be advantageously combined with a control and/or regulation reference clock cycle of 1 ms. With a second time interval which is equal to the first time interval, in one embodiment a smooth(er) signal can be advantageously realized, and particularly an advantageous velocity determination and/or advance calculation can also be used in the event of packet failures. With a second time interval which is greater than the first time interval, in one embodiment a faster sampling rate of the (detection of the, and/or detected) pose data can be combined with a slower control and/or regulation cycle. In a preferred embodiment, a quotient of the first time interval of the detected pose data divided by the second time interval of the modified pose data is at least 0.9, preferably at least 1, particularly at least 1.1, and/or at most 120, which in the present case is also generally referred to as (fine) interpolation. Accordingly, in a preferred embodiment, the second time interval is less than or equal to the first time interval and/or at most as great as the first time interval, and in one development is (simply) less than the first time interval.

By at least partially shifting the (fine) interpolation according to the invention into the space of the poses of the objects, in one embodiment different pose data detected at the same time, particularly pose data detected by different sensors, particularly with different time intervals, can advantageously be used, and particularly combined together, particularly superimposed, to control the robot arrangement, and/or can be transmitted to a controller for the purpose of controlling the robot arrangement.

Accordingly, in one embodiment, the method comprises the steps of:
 detecting further pose data of the object arrangement—in one embodiment, of the same and/or other object(s) of the object arrangement—parallel in time to and/or together with the detection of the (first) pose data, particularly by means of at least one additional sensor, wherein the further detected pose data have a further, particularly the same or different, particularly minimum, maximum and/or average and/or averaged, first time interval;
 determining, on the basis of and/or according to—and particularly from—the further detected pose data, further modified pose data of the object arrangement which have a further, particularly the same or a different, particularly minimum, maximum and/or average and/or averaged, second time interval which is less than or greater than this further first time interval or equal to this further first time interval; and
 controlling the robot arrangement, particularly determining, commanding and/or moving toward target positions of the robot arrangement, particularly the same and/or other robot(s) of the robot arrangement, based (also) on the further modified pose data, which in one development (can) comprise the same or a different clock rate and/or phasing with respect to the (first) modified pose data.

In a preferred embodiment, a quotient of the further first time interval of the further detected pose data divided by the further second time interval of the further modified pose data is at least 0.9, preferably at least 1, particularly at least 1.1, and/or at most 120. Accordingly, in a preferred embodiment, the further second time interval is less than or equal to the further first time interval and/or at most as great as the further first time interval, and in one development is (simply) less than the further first time interval.

A pose of an object according to the present invention depends, in one embodiment, on a particularly Cartesian, and/or one, two or three-dimensional, position and/or orientation, particularly an angular position, of the corresponding object, particularly relative to the robot arrangement and/or an environment, and/or in (Cartesian) space. It can particularly describe and/or indicate—and particularly, be—the position and/or orientation.

Accordingly, in one embodiment, the (first and/or further) detected pose data and/or the (first and/or further) modified pose data depend, particularly also or only, on a, particularly Cartesian, and/or one, two or three-dimensional, position and/or orientation of the object arrangement, particularly of the object and/or one or more of its objects, particularly relative to the robot arrangement and/or an environment and/or in (Cartesian) space. It can particularly describe and/or indicate—and particularly, be—the same.

It has surprisingly been found that the at least partial (fine) interpolation enables a particularly advantageous control of robots even in the area of (also) the orientation and/or angular position and/or angularity of detected objects.

In a further development, the (first and/or further) modified pose data are determined in such a way and/or with the proviso that a, particularly (absolute), rotation of the object arrangement and/or of the and/or of one or more objects of the object arrangement in space between (first and/or further) sequential modified pose data, or between which one or more pose data is/are available, is or will be minimal.

Figure 1:
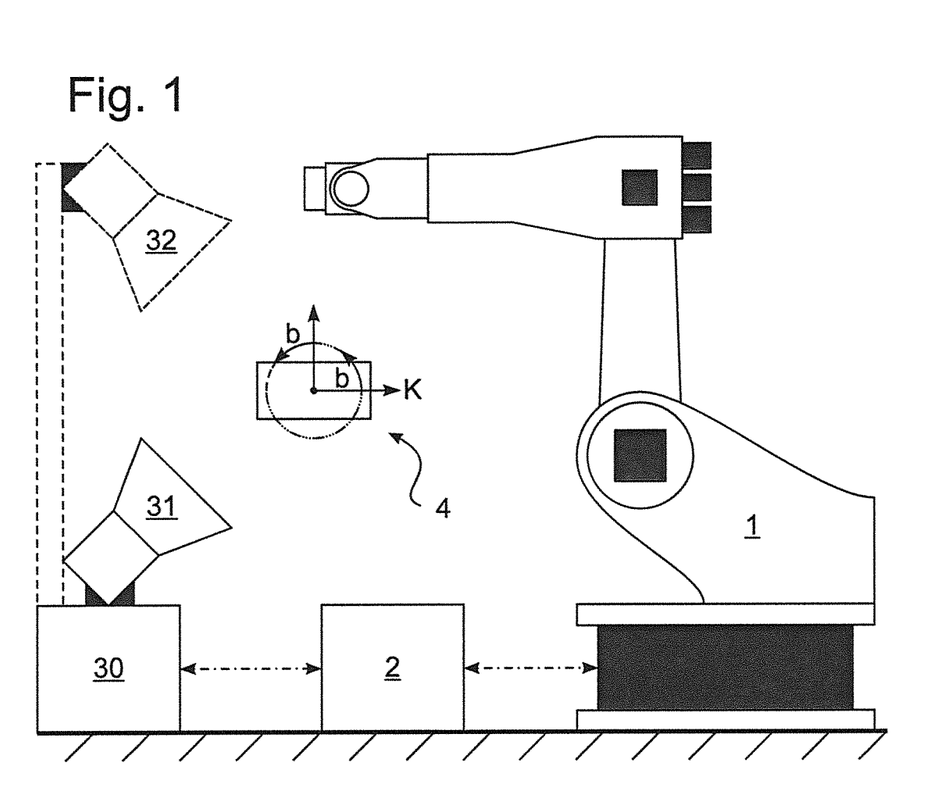
FIG. 1 shows an assembly having a robot and a system for controlling the robot according to an embodiment of the present invention.

If, as shown by way of example in FIG. 1, an object-fixed coordinate system K and a multiple-dot-dash sphere in FIG. 1 are shown around the center thereof, a rotation of the corresponding object 4 describes the penetration points of the coordinate system and/or its axes through the sphere paths b on the sphere, the lengths of which represent a measure of the rotation of the object.

Accordingly, in a further development, the (first and/or further) modified pose data are determined in such a way and/or with the proviso that these path(length)s are or will be minimized and/or lie on great circles of such a sphere, and/or move puncture points of an object-fixed coordinate system through a sphere along great circles of the sphere around its center.

As such, in one embodiment, an unexpected behavior, particularly an undesirable staggering, of the robot arrangement controlled on the basis of the (first and/or further modified) pose data, can be reduced, and particularly prevented.

Particularly for this purpose, the (first and/or further) detected pose data and/or the (first and/or further) modified pose data can comprise, and particularly be, quaternions.

Additionally or alternatively, in one embodiment, the (first and/or further) modified position data are (selected) in such a manner that their, particularly first, time derivative describes and/or indicates a, particularly absolute, angular velocity of the object arrangement, particularly of the object and/or one or more of the objects, particularly indirectly and/or directly, as is the case particularly with quaternions—in contrast, for example, to time derivatives of Euler or cardan angles.

In this way, in one embodiment, the above-explained minimum rotations and/or minimum paths and/or great circles can be realized, and/or a computing time can advantageously be shortened.

Quaternions are known to those skilled in the art for describing orientations and/or changes in orientation and/or rotations. As such, no further discussion need be included here. If the (first and/or further) detected pose data are not in quaternion representation, they are transformed into quaternion representation in one embodiment for the, and/or during the, determination of the (first and/or further) modified pose data—in one embodiment, for example, from a representation with Euler or cardan angles, as is common with sensors used for detecting orientations.

In one embodiment, the (first and/or further) modified pose data are determined in such a way and/or with the proviso that they satisfy or are described by a function, particularly piecewise polynomials—particularly third order—which approximates the (first and/or further) detected pose data, and particularly runs through (first and/or further) detected pose data and/or supporting points, which are particularly determined by linear interpolation between successive (first and/or further) detected pose data.

As a result, the modified pose data in one embodiment can be determined particularly advantageously, particularly by sampling and/or evaluating the function in the (respective) second time interval.

In a further development, the function has predetermined (time) derivatives at supporting points, which are particularly determined by successively detected pose data, particularly by linear interpolation between the same, indicating, in one embodiment, translational and/or rotational velocities, particularly (absolute) angular velocities, of the object arrangement. Additionally or alternatively, in a further development, the piecewise polynomials have the same derivative at their transition points.

As such, in one embodiment, particularly advantageous modified pose data can be determined, the same particularly having an (at least $C^1$-continuous) profile, and/or, particularly as a result, an undesired drive hum can be reduced and/or an evaluation can be improved.

In one embodiment, the (first and/or further) modified pose data are determined by means of one or more filters and/or filter stages, particularly low-pass filtering and/or stages, particularly of the (first and/or further) detected modified pose data.

As a result, in one embodiment, advantageous modified pose data can be determined, and particularly can be smoothed and/or measurement errors, particularly noise, can be reduced.

In one embodiment, upon and/or subsequently to an absence of (first and/or further) detected pose data for a, particularly prespecified, follow-up time, the modified and/or further modified pose data are determined in such a way and/or with the proviso that a, particularly translational and/or rotational, velocity, particularly an (absolute) angular velocity, of the object arrangement, particularly relative to the robot arrangement and/or an environment and/or in (Cartesian) space, is constant and/or kept constant between these modified pose data.

As a result, in one embodiment, a time delay in the detection of pose data and/or their transmission can be advantageously compensated for.

Additionally or alternatively, in one embodiment, upon and/or subsequently to an absence of (first and/or further) detected pose data for a, particularly prespecified, halt time which, in a further development, is greater than the follow-up time, the control of the robot arrangement on the basis of the modified and/or further modified pose data is stopped, and/or a warning is issued.

In this way, in one embodiment, it is possible to respond advantageously to an excessive time delay in the detection of pose data and/or the transmission thereof, and/or to reduce the risk of incorrect control of the robot arrangement resulting from the same.

In one embodiment, the (first and/or further) pose data of the object arrangement are determined using one or more, particularly non-contact and/or optical (first and/or additional) sensors, particularly one or more cameras which are particularly mounted in the surroundings or on the robot, particularly by means of an image processing procedure.

Additionally or alternatively, in one embodiment, the (first and/or further) modified pose data—in a further development via a network, particularly the Internet and/or a LAN, particularly WLAN and/or a cloud—are transmitted to a controller which controls the robot arrangement and/or the robot or one or more of its robots, and particularly determines, commands, or moves it toward target positions of the robot arrangement, particularly of the robot and/or one or more of its robots, on the basis of the (first and/or further) modified pose data, particularly for the robot assembly to follow, grasp, and/or avoid the and/or one or more object(s), and/or which is configured and/or used for this purpose, particularly using hardware and/or software, particularly a program.

Similarly, the (first and/or further) modified pose data can also be at least partially distributed and/or determined on several computers and/or in the robot controller.

Accordingly, the pose data in one embodiment can be detected particularly advantageously, particularly free of interference, precisely and/or quickly, and/or the at least partial displacement of the (fine) interpolation into the area of the poses of the objects and/or the superposition of first and further modified pose data be carried out particularly advantageously.

As already mentioned, in one embodiment, the control of the robot arrangement on the basis of the modified pose data and/or the further modified pose data can comprise—and particularly, be—a combination, particularly superimposing, of this pose data with manipulation instructions, particularly paths or the like, which are prespecified, and particularly defined, relative to the object order, particularly to the and/or one or more of its objects ("object-order-based manipulation instructions")—for example, the robot arrangement traversing prespecified paths towards and/or relative to the object arrangement.

According to one embodiment of the present invention, a system for the control the robot arrangement, particularly using hardware and/or software, particularly a program, is configured to carry out a method described here, and/or comprises (at least):

means for determining modified (first) pose data of an object arrangement having one or more objects, comprising a second, particularly minimum, maximum and/or average and/or averaged, time interval, on the basis of and/or as a function of detected (first) pose data of the object arrangement, wherein the second time interval is less than or greater than a first time interval or equal to a first time interval of the detected pose data, for the purpose of controlling the robot arrangement.

In one embodiment, the system comprises means for detecting the (first) pose data of the object arrangement, wherein the detected pose data comprises the first, particularly minimum, maximum and/or average and/or averaged, time interval; and/or means for controlling the robot arrangement, particularly determining, commanding and/or moving toward target positions of the robot arrangement, particularly of the and/or one or more of its robots, on the basis of the modified (first) pose data, particularly for the robot arrangement to follow, grasp, and/or avoid the and/or one or more object(s).

Additionally or alternatively, in one embodiment the system and/or its means comprise(s):

means for detecting further pose data of the object arrangement, comprising a further first time interval, chronologically in parallel to the detection of the (first) pose data, particularly by means of at least one additional sensor; and/or means for determining further modified pose data of the object arrangement, comprising a further second time interval which is less than or greater than the further first time interval or equal to the further first time interval, on the basis of the further detected pose data; and/or means for controlling the robot arrangement on the basis of this further modified pose data.

means for determining the modified pose data and/or further modified pose data in such a manner that a rotation of the object arrangement in space between modified pose data is minimal; and/or means for determining modified pose data and/or further modified pose data in such a manner that they satisfy a function, particularly of piecewise polynomials—particularly third order—which approximates the detected pose data, particularly through detected pose data and/or supporting points between successive detected pose data; and/or means for determining the modified pose data and/or the further modified pose data using at least one filtering; and/or means for determining the modified pose data upon the absence of detected pose data for a follow-up time, in such a manner that a velocity of the object arrangement in the space between modified pose data is constant; and/or means for stopping the control of the robot arrangement on the basis of the modified pose data and/or issuing a warning upon the absence of detected pose data for a halt time; and/or means for detecting the (first and/or further) pose data of the object arrangement using at least one, particularly non-contact and/or optical, sensor; and/or means for transmitting the (first and/or further) modified pose data to a controller for the purpose of controlling the robot arrangement; and/or means for combining, particularly superimposing, the modified pose data and/or the further modified pose data with object-order-based manipulation instructions for the purpose of controlling the robot arrangement.

A means in the context of the present invention may be formed by hardware and/or software, particularly a, preferably digital, processing unit, particularly a microprocessor unit (CPU), with a data and/or signal connection preferably to a memory and/or bus system, and/or one or more programs or program modules. The CPU can be configured to execute commands implemented as a program stored in a memory system, to receive input signals from a data bus, and/or to output signals to a data bus. A memory system can comprise one or more, particularly different, storage media, particularly optical, magnetic, solid state and/or other non-volatile media. The program can be such that it embodies and/or is capable of carrying out the methods described herein, such that the CPU can perform the steps of such methods, and thus can particularly control the robot arrangement. In one embodiment, a computer program product can comprise a, particularly non-volatile, storage medium for storing a program and/or can be a storage medium with a program stored thereon, wherein execution of this program causes a system and/or a controller, particularly a computer, to carry out a method described herein and/or one or more of its steps.

In one embodiment, one or more, particularly all, steps of the method are completely or partially automated, particularly by the system and/or its means.

Further advantages and features emerge from the dependent claims and the exemplary embodiments.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

FIG. 1 shows an assembly having a robot 1 and a system for controlling the robot 1 according to an embodiment of the present invention.

The system comprises a robot controller 2 and a detection and processing device 30 communicating therewith, which comprises a camera 31, for detecting pose data of objects 4.

By means of the camera 31, the detection and processing device 30 detects (first) pose data $x_s$, which describe the three-dimensional Cartesian position and/or orientation of the objects 4—of which only one is shown by way of example in FIG. 1—at specific times $t_1$, $t_5$, $t_9$. These are indicated by solid squares in FIG. 2.

Figure 2:
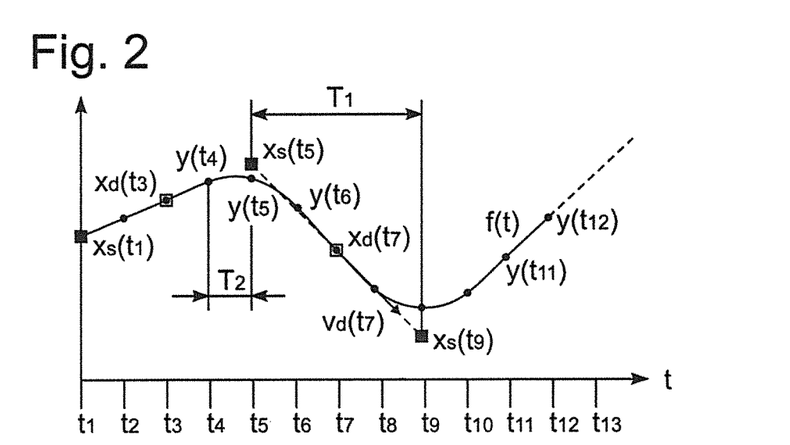
FIG. 2 shows detected and modified pose data.

Accordingly, these first pose data $x_s$ comprise a first time interval which is constant in this exemplary embodiment and corresponds to the sampling and/or evaluation rate of the camera 31 and/or detection and processing device 30. The detected pose data describe the orientation of the object 4, optionally after appropriate transformation, in quaternions.

Figure 3:
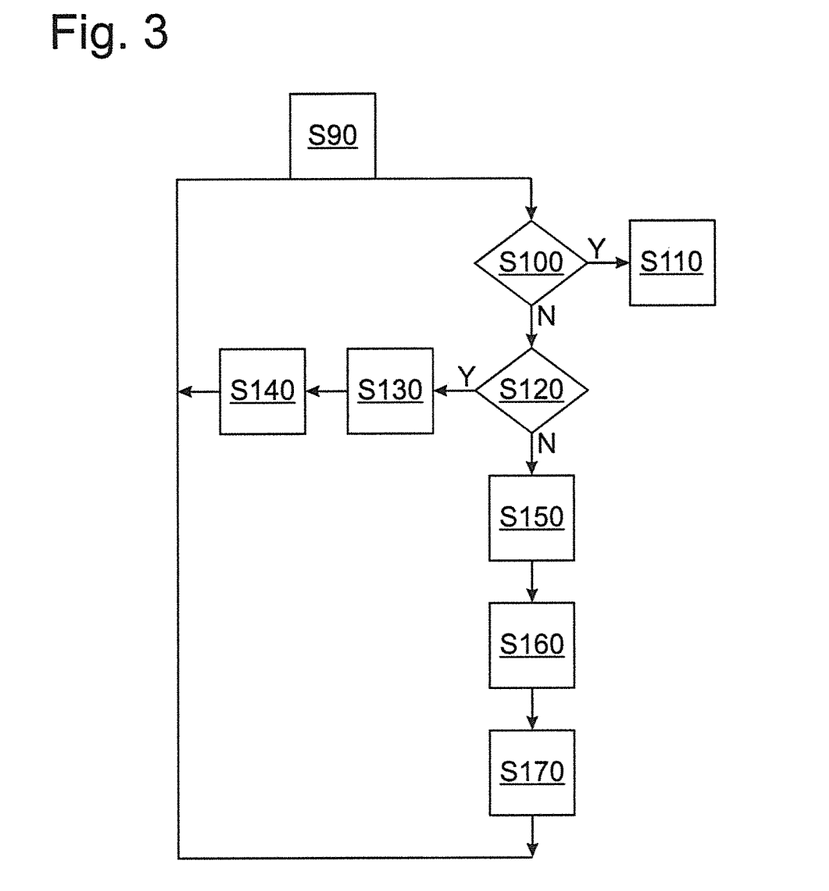
FIG. 3 shows a method for the control of the robot according to an embodiment of the present invention.

The camera 31 detects poses of the object 4 in a step S90 (see FIG. 3). The detection and processing device 30 checks in a step S100 whether a prespecified halt time has already passed since the last detected pose was received from the camera 31.

If this is the case (S100: "Y")—that is to say, there are no (new) detected pose data for the halt time—control of the robot 1 on the basis of the pose data is stopped and a warning is issued in a step S110.

Otherwise (S100: "N"), the detection and processing device 30 checks, in a step S120, whether a prespecified follow-up time has elapsed since the last detected pose was received from the camera 31.

If this is the case (S120: "Y")—that is to say, there are no (new) detected pose data for the follow-up time—modified pose data y(t) are determined in a step S130, in a manner described below with reference to FIG. 2, in such a manner that a translational and rotational velocity of the object 4 in the space between modified pose data and/or the time derivative of the determined modified pose data is constant, and the robot 1 is controlled, in step S140, on the basis of this modified pose data until either the halt time has passed or in the meantime a new detected pose has been received from the camera 31 (S90).

In other words, upon a delay of newly detected poses, it is assumed that the object 4 continues to move proceeding from the last supporting point at a constant Cartesian and (absolute) angular velocity, and the robot 1 is controlled on the basis of this assumption until either new poses are detected or the halt time is reached.

If newly detected poses are received by the camera 31 in time and/or within the follow-up time (S120: "N"), the detection and processing device 30 continues with a step S150.

In this step, it determines by linear interpolation a supporting point $x_d$, indicated in FIG. 2 by an empty square, in the middle between the newly detected and the previously detected pose, as well as a velocity $v_d$ at this supporting point, which likewise results from the linear interpolation and/or the quotient of the distance from the supporting point to the new pose divided by the corresponding time.

By way of example, FIG. 2 shows such a supporting point $x_d(t_7)$, which results from linear interpolation between the pose data $x_s(t_5)$ and $x_s(t_9)$, as indicated by dashed lines in FIG. 2, and the corresponding velocity $v_d(t_7)$ at this supporting point, found from $[x_s(t_9)-x_d(t_7)]/(t_9-t_7)$.

Then, in a step S160, the detection and processing device 30 determines a third-order polynomial function f defined piecewise by third-order polynomials in such a way that it adjoins the preceding polynomial in a $C^1$-continuous manner and/or has the same (time) derivative at the transition point, as well as runs through the new supporting point $x_d$, where it has the determined velocity $v_d(t_7)$.

This function f and/or this polynomial (piece) is evaluated in the control cycle of the robot controller 2 in a step S170—that is, with a shorter time interval $T_2$—and produces the modified pose data y, which in FIG. 2 are indicated by solid circles and are indicated by way of example for the times $t_4$, $t_5$, $t_6$, $t_{11}$ and $t_{12}$.

On the basis of this modified pose data y, the robot controller 2 controls the robot 1 in step S170—for example, to grasp the object 4, or the like. In one embodiment, for the control, an object-based manipulation instruction—for example, a (processing) path defined relative to the object 4—can be superimposed on the modified pose data y, and the robot 1 can be controlled on the basis of the modified pose data y and the object-based manipulation instruction.

It can be seen in FIG. 2 that a newly detected pose would have to be present for the time point $t_{13}=t_{19}+T_1$ in order to be able to determine a new supporting point for $t_{11}$, and thus the next polynomial piece, in the manner described.

However, since such a newly detected pose is not yet available in the exemplary embodiment within the follow-up time, in step S130, the function f is continued linearly at the corresponding point $t_{11}$ with the slope $f'(t_{11})$ present there, as shown in FIG. 2 by dashed lines, such that the translational and rotational velocity of the object 4 in the space between modified pose data is constant starting from $t_{11}$.

Then, in step S140, analogous to step S170, this function is then evaluated in the control cycle of the robot controller 2 and/or with the shorter time interval $T_2$, and produces the modified pose data $y(t_{12})$.

If there is no newly detected pose after the halt time (S100: "Y"), the method is stopped.

In the method described, the rotation of the object 4 in the space between modified pose data y is advantageously minimal, particularly due to the polynomial interpolation of the quaternions, such that, particularly, staggering is prevented.

In parallel, further modified pose data can also be determined for further pose data detected chronologically in parallel by a camera 32 in an analogous manner described herein, and the robot 1 can also be controlled on the basis of this further modified pose data.

Advantageously, the robot controller 2 can be provided with the modified pose data from the camera 31 and the further modified pose data from the camera 32 with the same cycle timing. This can be done by the modified pose data and the further modified pose data being determined with the same second time interval $T_2$ and/or comprising the same second time interval. Likewise, the modified pose data and the further modified pose data can also have different cycle rates and/or phasing.

It can be seen in FIG. 2 that the modified pose data y "lag behind" the detected pose data $x_s$ by a delay of $T_1/2$, since the corresponding supporting point (for example, $x_d(t_7)$) and the velocity and/or time derivative given there (for example, $v_d(t_7)$) are only determined and used for the approximation by the function f and/or the (fine) interpolation once the newly detected pose (for example $x_s(t_9)$) is received, as long as the expected next and/or newly detected pose is not missing (for example, $x_s(t_{13})$).

Although exemplary embodiments have been explained in the foregoing description, it should be understood that a variety of modifications are possible. It should also be noted that the exemplary embodiments are merely examples that are not intended to limit the scope, applications and construction in any way. Rather, the person skilled in the art is given a guide by the preceding description for the implementation of at least one exemplary embodiment, wherein various modifications, particularly with regard to the function and arrangement of the components described, can be made without departing from the scope of the invention as defined according to the claims and to combinations of features equivalent thereto.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMBERS 1 robot (arrangement)
2 robot controller
30 detection and processing device
31, 32 camera
4 object (arrangement)
F function
$T_1$ first time interval
$T_2$ second time interval
$v_d$ velocity
$x_s$ detected pose (data))
$x_d$ supporting points
y modified pose data

What is claimed is:

1. A method for the control of a robot assembly having at least one robot to perform an operation on at least one object, the method comprising:
    detecting with a first sensor, first pose data of the at least one object, the first pose data comprising a first time interval;
    determining first modified pose data of the at least one object on the basis of the first detected pose data, the first modified pose data comprising a second time interval that is less than or greater than the first time interval, or equal to the first time interval;
    controlling the robot assembly on the basis of the first modified pose data;
    detecting second pose data of the at least one object, the second pose data comprising a third time interval that is chronologically parallel to the detection of the first pose data;
    determining second modified pose data of the at least one object on the basis of the second detected pose data, the second modified pose data comprising a fourth time interval that is less than or greater than the third time interval, or equal to the third time interval; and controlling the robot assembly on the basis of the second modified pose data;

wherein at least one of the detected or modified first pose data and/or at least one of the detected or modified second pose data depend on an orientation of the at least one object; and wherein determining at least one of the first modified pose data or the second modified pose data comprises determining the at least one of the first or second modified pose data in such a manner that a rotation of the at least one object in a space between the first modified pose data or the second modified pose data is minimal.

2. The method of claim 1, wherein detecting the second pose data comprises detecting the second pose data with a second sensor.

3. The method of claim 1, wherein at least one of:
the first and second pose data comprise quaternions; or
a time derivative of the first and second pose data describe an angular velocity of the at least one object.

4. The method of claim 1, wherein determining at least one of the first modified pose data or the second modified pose data comprises determining the modified pose data in such a manner that the first and second modified pose data satisfy a function that approximates at least one of the first detected pose data or second detected pose data.

5. The method of claim 4, wherein at least one of:
the function comprises piecewise polynomials;
the function comprises third order polynomials; or
the function is satisfied when the first or second modified pose data runs through the first detected pose data, the second detected pose data, or supporting points between successive ones of at least the first detected pose data or the second detected pose data.

6. The method of claim 5, wherein at least one of:
the function comprises prespecified derivatives at supporting points; or
the piecewise polynomials have the same derivative at respective transition points of the piecewise polynomials.

7. The method of claim 6, wherein the prespecified derivatives are determined by successive detected pose data.

8. The method of claim 1, wherein determining at least one of the first modified pose data or the second modified pose data comprises determining the at least one of the first or second modified pose data by at least one filtering.

9. The method of claim 1, further comprising:
when detected pose data is absent at a predetermined follow-up time, then determining the first modified pose data and the second modified pose data in such a manner that a velocity of the at least one object in a space between the first and second modified pose data is constant.

10. The method of claim 1, further comprising:
when detected first or second pose data is absent at a predetermined halt time, then at least one of:
stopping control of the robot assembly based on the modified pose data; or
issuing a warning.

11. The method of claim 1, wherein at least one of:
detecting the first or second pose data of the at least one object comprises detecting the pose data using at least one sensor; or
transmitting at least one of the first modified pose data or the second modified pose data to a controller for the purpose of controlling the robot arrangement.

12. The method of claim 11, wherein the at least one sensor is at least one of a non-contact sensor or an optical sensor.

13. The method of claim 1, wherein control of the robot assembly based on at least one of the first modified pose data or the second modified pose data comprises the combination of the first or second modified pose data with object-order-based manipulation instructions.

14. A system for controlling a robot assembly having at least one robot to perform an operation on at least one object, the system comprising means for:
detecting first pose data of the at least one object, the first pose data comprising a first time interval;
determining first modified pose data of the at least one object on the basis of the first detected pose data, the first modified pose data comprising a second time interval that is less than or greater than the first time interval, or equal to the first time interval;
controlling the robot assembly on the basis of the first modified pose data;
detecting second pose data of the at least one object, the second pose data comprising a third time interval that is chronologically parallel to the detection of the first pose data;
determining second modified pose data of the at least one object on the basis of the second detected pose data, the second modified pose data comprising a fourth time interval that is less than or greater than the third time interval, or equal to the third time interval; and
controlling the robot assembly on the basis of the second modified pose data;
wherein at least one of the detected or modified first pose data and/or at least one of the detected or modified second pose data depend on an orientation of the at least one object; and
wherein determining at least one of the first modified pose data or the second modified pose data comprises determining the modified pose data in such a manner that a rotation of the at least one object in a space between the first modified pose data or the second modified pose data is minimal.

15. An arrangement, comprising:
a robot assembly having at least one robot; and
a system according to claim 14 for controlling the robot assembly.

16. A computer program product for use in controlling a robot assembly having at least one robot to perform an operation on at least one object, the computer program product having program code stored in a non-transitory computer-readable medium that, when executed by a computer, causes the computer to:
detect with a first sensor, first pose data of the at least one object, the first pose data comprising a first time interval;
determine first modified pose data of the at least one object on the basis of the first detected pose data, the first modified pose data comprising a second time interval that is less than or greater than the first time interval, or equal to the first time interval;
control the robot assembly on the basis of the first modified pose data;
detect second pose data of the at least one object, the second pose data comprising a third time interval that is chronologically parallel to the detection of the first pose data;
determine second modified pose data of the at least one object on the basis of the second detected pose data, the second modified pose data comprising a fourth time interval that is less than or greater than the third time interval, or equal to the third time interval; and control the robot assembly on the basis of the second modified pose data;

wherein at least one of the detected or modified first pose data and/or at least one of the detected or modified second pose data depend on an orientation of the at least one object; and wherein determining at least one of the first modified pose data or the second modified pose data comprises determining the modified pose data in such a manner that a rotation of the at least one object in a space between the first modified pose data or the second modified pose data is minimal.

* * * * *